United States Patent
Woods et al.

(10) Patent No.: US 9,243,083 B2
(45) Date of Patent: Jan. 26, 2016

(54) THIOL-ENE CURED OIL-RESISTANT POLYACRYLATE SEALANTS FOR IN-PLACE GASKETING APPLICATIONS

(75) Inventors: John G. Woods, Farmington, CT (US); Richard O. Angus, Jr., Moosup, CT (US); Joel D. Schall, Hamden, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 1062 days.

(21) Appl. No.: 12/062,090

(22) Filed: Apr. 3, 2008

(65) Prior Publication Data

US 2014/0216649 A1  Aug. 7, 2014

(51) Int. Cl.
| | |
|---|---|
| *B29C 65/00* | (2006.01) |
| *C08F 8/02* | (2006.01) |
| *C08F 8/14* | (2006.01) |
| *C08F 8/32* | (2006.01) |
| *C08F 8/34* | (2006.01) |
| *C09J 133/14* | (2006.01) |
| *C08K 5/00* | (2006.01) |
| *C08K 5/372* | (2006.01) |

(52) U.S. Cl.
CPC ... *C08F 8/02* (2013.01); *C08F 8/14* (2013.01); *C08F 8/32* (2013.01); *C08F 8/34* (2013.01); *C09J 133/14* (2013.01); *C08K 5/0025* (2013.01); *C08K 5/372* (2013.01); *G02F 2202/023* (2013.01); *G02F 2202/28* (2013.01)

(58) Field of Classification Search
CPC ......... C08G 59/18; C08L 33/00; C08L 53/00; C08F 299/00; C08J 3/008
USPC ......... 525/212–214, 119, 107, 529, 530–533; 524/560–562, 224, 343–347, 349–352, 524/327.5, 329.8, 330.4, 331.8, 332.4; 156/275.5; 522/40–43; 428/422; 442/149
See application file for complete search history.

(56) References Cited

U.S. PATENT DOCUMENTS

| | | | |
|---|---|---|---|
| 3,504,080 A | 3/1970 | Siggel et al. | |
| 3,676,283 A * | 7/1972 | Kehr et al. | 442/149 |
| 3,690,815 A | 9/1972 | Dellian | |
| 4,767,809 A | 8/1988 | Wingrove | |
| 4,772,031 A | 9/1988 | Poppo | |
| 4,808,638 A | 2/1989 | Steinkraus et al. | |
| 4,965,129 A | 10/1990 | Bair et al. | |
| 5,028,661 A | 7/1991 | Clark et al. | |
| 5,135,978 A * | 8/1992 | Sasaki | 524/274 |
| 5,208,281 A | 5/1993 | Glaser | |
| 5,358,976 A * | 10/1994 | Dowling et al. | 522/18 |
| 5,371,181 A | 12/1994 | Glaser et al. | |
| 5,399,624 A | 3/1995 | Glaser et al. | |
| 5,459,173 A | 10/1995 | Glaser et al. | |
| 5,917,006 A * | 6/1999 | Smith et al. | 528/373 |
| 6,172,150 B1 | 1/2001 | Kollmann et al. | |
| 6,265,476 B1 | 7/2001 | Krongauz et al. | |
| 6,506,460 B1 | 1/2003 | Paglia et al. | |
| 6,930,147 B1 | 8/2005 | Nakagawa et al. | |
| 8,389,630 B2 * | 3/2013 | Tamai et al. | 525/119 |
| 2006/0069176 A1 | 3/2006 | Bowman et al. | |
| 2006/0089431 A1 | 4/2006 | Kawakami et al. | |
| 2007/0021554 A1 | 1/2007 | Urban et al. | |
| 2007/0043205 A1 | 2/2007 | Dias et al. | |

FOREIGN PATENT DOCUMENTS

| | | | |
|---|---|---|---|
| CA | 2522468 A1 | | 10/2004 |
| EP | 1477511 | * | 11/2004 |
| JP | 58-052377 | | 3/1983 |
| JP | 2007-169335 | | 7/2007 |
| WO | 9500869 | | 1/1995 |

OTHER PUBLICATIONS

International Search Report issued in connection with International Patent Application No. PCT/US2009/039256.
C.R. Morgan et al., Thiol/Ene Photocurable Polymers, J. Polym. Sci., 15, 627-45 (1977).
V. Percec et al., J. Am. Chem. Soc., 128, 14156 (2006).
J. Crivello et al., J. Polym. Sci. Part A, 34, 1015 (1996).

* cited by examiner

*Primary Examiner* — Monique Peets
(74) *Attorney, Agent, or Firm* — Steven C. Bauman

(57) ABSTRACT

The present invention relates to thiol-ene curing compositions, which cure upon exposure to ultraviolet (UV) light and/or heat. The compositions include components having alkenyl (or "ene") functionality and components having thiol functionality, which undergo thiol-ene curing. The compositions also include a cure system. More specifically, in some embodiments, the curable compositions include a vinyl polymer bearing alkenyl or thiol terminal functional group(s) and a cross-linking agent having the opposing functionality, i.e., thiol cross-linking agents with alkenyl-terminated vinyl polymers and vinyl cross-linking agents with thiol-terminated vinyl polymers. Also provided are methods of making and using the compositions, such as for sealants for in-place gasketing applications.

5 Claims, No Drawings

THIOL-ENE CURED OIL-RESISTANT POLYACRYLATE SEALANTS FOR IN-PLACE GASKETING APPLICATIONS

BACKGROUND OF THE INVENTION

1. Field of the Invention

The present invention provides curable compositions, which cure upon exposure to ultraviolet ("UV") light and/or heat by a thiol-ene mechanism. The compositions include components having alkenyl (or "ene") functionality and components having thiol functionality, which undergo thiol-ene curing. Also provided are methods of making the compositions.

2. Brief Description of Related Technology

UV-curable elastomers are used for a variety of applications, such as, for examples, adhesives and sealants. Known UV-curable elastomers, including acrylic elastomers, particularly elastomers derived from blends of polymers sold under the trade name VAMAC (available commercially from Dupont) and acrylate monomers, often involve a number of processing concerns. In particular, such UV-curable elastomers generally require the use of rubber mills for compounding and hot melt equipment for dispensing and application. The application temperature may range anywhere from 90-170° C. Moreover, such systems are inhibited by air and require long exposures to high intensity light to ensure cure. These requirements add costs to the process and also prevent the use of thermal-initiated curing.

There is a need therefore for UV and/or heat curable elastomers that proceed via a different curing mechanism. In particular, there is a need for curable compositions based on thiol-ene chemistry that can be used for a variety of applications, particularly as sealants for in-place gasketing applications.

SUMMARY OF THE INVENTION

The present invention provides a class of curable compositions based on thiol-ene chemistry, which may be useful as sealants. In thiol-ene photocuring systems, the reaction generally proceeds by UV-induced addition of polythiols to polyenes, typically using photoinitiators. A background discussion of the chemistry involved in thiol-ene curing systems may be found in C. R. Morgan et al., *Thiol/Ene Photocurable Polymers*, J. Polymer Science, vol. 15, 627-645 (1977).

The thiol-ene curing compositions described herein do not involve the processing considerations noted above in connection with some acrylic systems. Thiol-ene curable systems are not compromised through air inhibition, thereby permitting cure by low-intensity UV-light and/or heat to obtain cured surfaces. Moreover, these systems are relatively low viscosity liquids, which provides for ease of dispensing and application. The compositions cure rapidly without volatile emissions. The cured products are elastomeric, strong and resistant to oils and solvents, making the compositions particularly suitable for gasketing and other sealing applications.

In one aspect, the present invention provides a composition which includes:

(a) a vinyl polymer bearing at least one terminal functional group having the formula I or II:

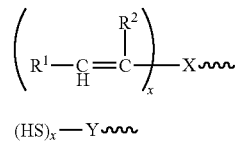

where:
$R^1$ and $R^2$ are independently selected from H, $C_{1-6}$ alkyl and $C_{4-8}$ cycloalkyl, or $R^1$ and $R^2$ when taken together with the carbon atoms to which they are attached complete a $C_{4-8}$ cycloalkenyl ring optionally containing a heteroatom and optionally substituted by one or more halo groups;

X is selected from a bond, $C_{1-17}$ hydrocarbyl, oxygen and sulfur, wherein the $C_{1-17}$ hydrocarbyl optionally includes one or more groups selected from ether, thioether, acetal, thioacetal, ester, thioester, urethane, urea, thiourea, amine, amide, thioamide, carbamate and carbonate, and wherein the $C_{1-17}$ hydrocarbyl optionally is substituted by one or more halo groups;

Y is selected from $C_{1-17}$ hydrocarbyl optionally including one or more groups selected from ether, thioether, acetal, thioacetal, ester, thioester, urethane, urea, thiourea, amine, amide, thioamide, carbamate and carbonate, and wherein the $C_{1-17}$ hydrocarbyl optionally is substituted by one or more halo groups;

x is 1 to 4;

(b) a cross-linking agent including one or more of:
(i) a thiol cross-linking agent when the vinyl polymer of (a) bears at least one functional group having the formula I; or
(ii) a vinyl cross-linking agent when the vinyl polymer of (a) bears at least one functional group having the formula II; and
(c) a cure system.

In another aspect of the present invention, there is provided a method of preparing a curable composition, which includes the steps of:

(a) providing a vinyl polymer bearing at least one functional group having the formula I or II:

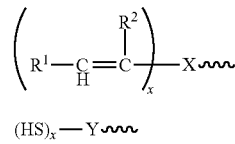

where:
$R^1$ and $R^2$ are independently selected from H, $C_{1-6}$ alkyl and $C_{4-8}$ cycloalkyl, or $R^1$ and $R^2$ when taken together with the carbon atoms to which they are attached complete a $C_{4-8}$ cycloalkenyl ring optionally containing a heteroatom and optionally substituted by one or more halo groups;

X is selected from a bond, $C_{1-17}$ hydrocarbyl, oxygen and sulfur, wherein the $C_{1-17}$ hydrocarbyl optionally includes one or more groups selected from ether, thioether, acetal, thioacetal, ester, thioester, urethane, urea, thiourea, amine, amide, thioamide, carbamate and carbonate, and wherein the $C_{1-17}$ hydrocarbyl optionally is substituted by one or more halo groups;

Y is selected from $C_{1-17}$ hydrocarbyl optionally including one or more groups selected from ether, thioether, acetal, thioacetal, ester, thioester, urethane, urea, thiourea, amine, amide, thioamide, carbamate and carbonate, and wherein the $C_{1-17}$ hydrocarbyl optionally is substituted by one or more halo groups;

x is 1 to 4;

(b) adding a cross-linking agent to the vinyl polymer, the cross-linking agent including one or more of:

(i) a thiol cross-linking agent when the vinyl polymer of (a) bears at least one functional group having the formula I; or (ii) a vinyl cross-linking agent when the vinyl polymer of (a) bears at least one functional group having the formula II; and (c) adding a cure system to form a curable composition.

DETAILED DESCRIPTION OF THE INVENTION

The present invention is directed to curable compositions that include both components having thiol functionality and components having alkenyl, or ene, functionality. Based on these functional groups, the compositions are cured by a thiol-ene mechanism and thus are not inhibited by air. The compositions can be cured by using relatively low-intensity UV light or by heating to obtain a completely cured surface. Additionally, the compositions are relatively low in viscosity and can be readily processed and dispensed at ambient temperatures. For instance, the compositions may have viscosities of about 1,000 to 5,000,000, more specifically about 10,000 to 500,000 mPa·s at 23° C., in some embodiments. Conventional reinforcing agents can be added to the compositions, while still maintaining good processing properties. This improves the mechanical strength and reduces the oil swell of the cured product.

These inventive compositions are useful in a variety of end-use applications including adhesive, sealant, coating and potting applications, as well as other uses in the electronic, automotive and consumer markets. For instance, the compositions are suitable as sealants for in-place gasketing applications, such as, automotive gasketing applications.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The compositions of the present invention include a component having thiol functionality, a component having alkenyl functionality and a cure system. In some embodiments, the compositions include a vinyl polymer bearing either alkenyl or thiol terminal functional group(s). Depending on the type of terminal functional group(s) on the polymer, i.e., alkenyl or thiol, the composition also includes a cross-linking agent having the opposing functionality. By "opposing" functionality, it is meant a cross-linking agent having thiol functionality in embodiments where the vinyl polymer has alkenyl terminal functional group(s) and a cross-linking agent having alkenyl functionality where the vinyl polymer has thiol terminal functional group(s).

More specifically, the vinyl polymer bears at least one terminal functional group having the formula I or II:

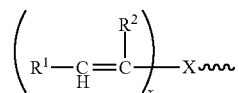

where:

$R^1$ and $R^2$ are independently selected from H, $C_{1-6}$ alkyl and $C_{4-8}$ cycloalkyl, or $R^1$ and $R^2$ when taken together with the carbon atoms to which they are attached complete a $C_{4-8}$ cycloalkenyl ring optionally containing a heteroatom and optionally substituted by one or more halo groups;

X is selected from a bond, $C_{1-17}$ hydrocarbyl, oxygen and sulfur, where the $C_{1-17}$ hydrocarbyl optionally includes one or more groups selected from ether, thioether, acetal, thioacetal, ester, thioester, urethane, urea, thiourea, amine, amide, thioamide, carbamate and carbonate, and where the $C_{1-17}$ hydrocarbyl optionally is substituted by one or more halo groups;

Y is selected from $C_{1-17}$ hydrocarbyl optionally comprising one or more groups selected from ether, thioether, acetal, thioacetal, ester, thioester, urethane, urea, thiourea, amine, amide, thioamide, carbamate and carbonate, and where the $C_{1-17}$ hydrocarbyl optionally is substituted by one or more halo groups; and x is 1 to 4.

In the definition of $R^1$ and $R^1$ above, the $C_{4-8}$ cycloalkenyl ring may optionally contain a heteroatom. In such embodiments, one or more of the carbon atoms in the ring optionally are hetero element(s) other than carbon, for example, nitrogen, oxygen or sulfur.

In the definitions of X and Y above, the hydrocarbyl groups may be linear or branched and may include cyclic groups.

In some embodiments, X may be a linear or branched $C_{1-12}$ hydrocarbyl optionally including one or more groups selected from ether, thioether, acetal, thioacetal, ester, thioester, urethane, urea, thiourea, amine, amide, thioamide, carbamate and carbonate.

In some embodiments, Y is selected from linear or branched $C_{1-12}$ hydrocarbyl optionally including one or more groups selected from ether, thioether, acetal, thioacetal, ester, thioester, urethane, urea, thiourea, amide, thioamide, carbamate and carbonate.

In some instances, Y in formula II above attaches to the main chain of the vinyl polymer via a sulfur atom, for example, when a multi-functional thiol forms the terminal functional group(s). In particular, one thiol group of the multi-functional thiol may be consumed in the reaction, thereby resulting in attachment to the main chain of the vinyl polymer via a sulfur atom. Such attachment may be represented by the following formula II(a):

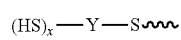

As represented in formulas I and II above, each terminal alkenyl or thiol functional group may have a degree of functionality of 1 to 4. In addition, the vinyl polymers may bear more than one terminal functional group of formulas I or II. For instance, in some embodiments, the vinyl polymer may bear four terminal functional groups of formulas I or II, thereby increasing the overall degree of functionality of the vinyl polymer. Accordingly, the vinyl polymers described herein may have a degree of functionality of alkenyl or thiol terminal functional groups of 1 to 12.

Vinyl polymers bearing the terminal functional group(s) of formula I or II shown above bear terminal alkenyl or thiol functional groups. These vinyl polymers are combined with the opposing cross-linking agents for thiol-ene curing. In some embodiments, in addition to the thiol-ene cure, the vinyl polymers may also include terminal alkoxysilane groups, which would add moisture-curing capability to the compositions. Alternatively, in some embodiments, the vinyl polymers do not bear any alkoxysilane groups, or particularly terminal alkoxysilane groups. In embodiments that do not include alkoxysilane groups, the compositions may not be moisture curing. In such embodiments, the compositions are free of moisture curing catalysts.

In particular, the vinyl polymer bearing at least one terminal functional group of formula I represented above contains at least one alkenyl terminal functional group. In some embodiments, the compositions include a thiol cross-linking agent in combination with this polymer, thereby including a vinyl polymer component with alkenyl functionality and a cross-linking agent with thiol functionality.

In some other embodiments, the vinyl polymer bearing at least one terminal functional group of formula II represented above contains at least one thiol terminal functional group. Such compositions include a vinyl cross-linking agent in combination with this polymer, thereby including a vinyl polymer component with thiol functionality and a cross-liking agent with vinyl functionality.

In still other embodiments, the compositions may include both a vinyl polymer bearing at least one terminal functional group of formula I and a vinyl polymer bearing at least one terminal functional group of formula II. Accordingly, such compositions include both a vinyl polymer having alkenyl functionality and a vinyl polymer having thiol functionality. These polymers are capable of cross-linking with one another through a thiol-ene mechanism.

Desirably, the alkenyl and thiol components are combined in stoichiometric or near stoichiometric levels. More specifically, the thiol-ene curing of the compositions occurs by a step-growth mechanism. The functionality of the alkenyl and vinyl components and the reaction stoichiometry are desirably adjusted to obtain a gelled three dimensional network upon cure. If the molecular weight and the functionality of the thiol and alkenyl components are known, the extent of reaction at gel point ($\alpha$) can be determined from the following equation:

$$\alpha = 1/\{r(f_a-1)(f_t-1)\}^{0.5}$$

where $f_a$ and $f_t$ represent the weight-average functionality of alkenyl and thiol components respectively and r is the stoichiometric imbalance (i.e., the ratio of the number of reactive equivalents of thiol:alkenyl or alkenyl thiol, whichever is the lesser). To obtain a chemically cross-linked polymer, it is necessary to select $f_a$, $f_b$ and r such that $\alpha < 1$.

The equivalent weight ratio of thiol:alkenyl components or alkenyl:thiol components in the compositions described herein is about 0.5:1 to 1.5:1, more desirably about 0.8:1 to 1.2:1, and even more desirably about 1:1, provided that the ratios selected result in a chemically cross-linked product. When the ratio of thiol:alkenyl groups is about 1:1, there is an equal number of thiol and alkenyl functional groups present in the composition, which is generally desirable in most embodiments for optimal curing of the compositions.

The average functionality of all of the alkenyl and thiol groups present desirably is greater than 2. In particular, in some embodiments, the average functionality of the alkenyl terminal functional group(s) of formula I present on the vinyl polymer and the thiol functional groups of the thiol cross-linking agent is greater than 2. In some other embodiments, the average functionality of the thiol terminal functional groups(s) of formula II present on the vinyl polymer and the alkenyl functional groups of the vinyl cross-linking agent is greater than 2. The average functionalities of the alkenyl and vinyl groups in the composition can be balanced with ratio "r", within the ranges set forth above, to obtain $\alpha < 1$ in the equation above, and thus, a chemically cross-linked polymer composition upon cure. For instance, although the ratio "r" of thiol:alkenyl components desirably is about 1:1 in some embodiments, ratios of about 0.5:1 to about 1.5:1 are effective provided the average functionalities of the alkenyl and thiol components are sufficiently high to provide $\alpha < 1$.

Suitable vinyl polymers, thiol cross-linking agents and vinyl cross-linking agents are described in more detail in the following sections.

Vinyl Polymers

The main polymer chain of the vinyl polymer may be formed by polymerization of vinyl monomers. Desirably, the vinyl polymer is formed from non-homopolymerizable alkenes. Illustrative vinyl monomers include, for example, but are not limited to, (meth)acrylic acid monomers such as (meth)acrylic acid, methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl (meth)acrylate, 2-hydroxypropyl (meth)acrylate, stearyl(meth)acrylate, glycidyl (meth)acrylate, 2-aminoethyl(meth)acrylate, -(methacryloyloxypropyl)trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl(meth)acrylate, 2-perfluorodecylethyl(meth)acrylate and 2-perfluorohexadecylethyl(meth)acrylate; styrenic monomers such as styrene, vinyltoluene, $\alpha$-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltiethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methaerylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, and the like. These monomers may be used each alone or a plurality of them may be copolymerized. Particularly advantageous are those polymers formed from (meth)acrylate monomers.

For instance, the vinyl polymer may be selected from, but is not limited to, poly(meth)acrylates, polystyrenes, polybutadienes, polyvinylidene chlorides, polyacrylamides and combinations thereof. In general, the vinyl polymers do not have silicon and oxygen repeating units in the polymer backbone. The vinyl polymers can include additional functional groups without compromising the nature of the vinyl polymer backbone.

In some instances, the vinyl polymer backbone may include a fragment of an initiator from the polymerization process. For example, diethyl meso-2,5-dibromoadipate may be used as an initiator and thus a fragment of this initiator may form part of the polymer backbone, as shown in Example 3 of this invention. Other examples can be seen in the vinyl polymers of formulas VIa-VIj below.

Vinyl Polymers Bearing Terminal Alkenyl Functional Groups

The vinyl polymer, including any of the vinyl polymer chains described above, may bear at least one alkenyl terminal functional group. Such polymers may be combined with thiol cross-linking agents, which are described in more detail below. In some embodiments, the alkenyl-functionalized polymer may be combined with a vinyl polymer bearing thiol functional group(s) of formula II above.

More specifically, the compositions may include a vinyl polymer having the following formula III:

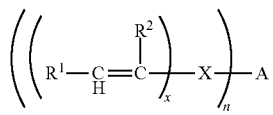

(III)

where A is a vinyl polymer backbone, n is 1 to 64 and the remaining variables are as defined above. Vinyl polymer backbone, A, may be linear or branched. The alkenyl functional group(s) shown in formula III are terminal group(s).

In some embodiments, the compositions include a vinyl polymer of formula III above in which n is 2 and the vinyl polymer backbone A is selected from the following formulas V and VI:

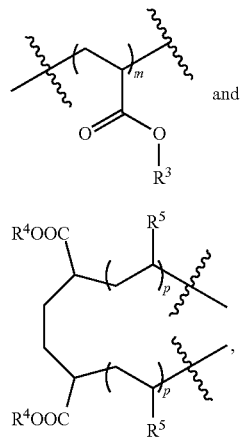

V and

VI where:

$R^3$ is selected from $C_{1-6}$ alkyl, —$CH_2OCH_3$ and —$CH_2CH_2OCH_3$;

$R^4$ is selected from $C_{1-6}$ alkyl;

$R^5$ is independently selected from —OC(O)—$CH_2$—$CH_3$; —OC(O)—$CH_2$—$CH_2$—$OCH_3$; and —OC(O)—$(CH_2)_3$—$CH_3$;

m is 10 to 10,000; and p is 5 to 5,000.

In some embodiments, $R^3$ in formula V above is selected from butyl, particularly n-butyl, ethyl, hexyl, methoxyethyl and methoxymethyl. In some embodiments, $R^4$ in formula VI is ethyl.

For instance, in some embodiments, the vinyl polymer bearing terminal alkenyl functional group(s) may be selected from the following formulas VIa-VIe:

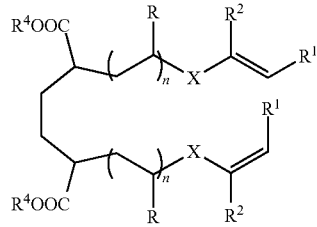

(VIa)

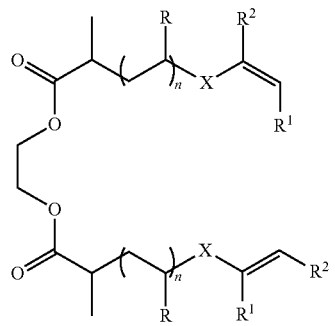

(VIb)

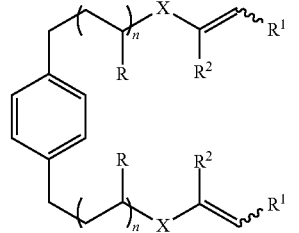

(VIc)

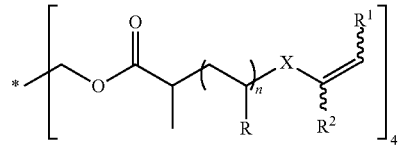

(VId)

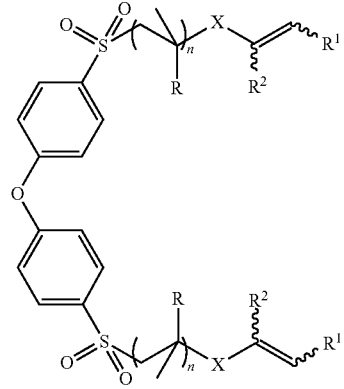

(VIe)

where R is independently selected from —OC(O)—CH$_2$—CH$_3$; —OC(O)—CH$_2$—CH$_2$—OCH$_3$; and —OC(O)—(CH$_2$)$_3$—CH$_3$; and the remaining variables are as defined above.

Vinyl Polymers Bearing Terminal Thiol Functional Groups

In some other embodiments, the vinyl polymer, including any of the vinyl polymer chains described above, may bear at least one thiol terminal functional group. Such polymers may be combined with alkenyl cross-linking agents, which are described in more detail below. In some embodiments, the thiol-functionalized polymer may be combined with a vinyl polymer bearing alkenyl functional group(s) of formula I above.

More specifically, the compositions may include a vinyl polymer having the following formula IV:

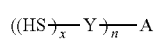

IV where A is a vinyl polymer backbone, n is 1 to 64 and the remaining variables are as defined above. Vinyl polymer backbone, A, may be linear or branched. The thiol functional group(s) shown in formula III are terminal groups.

Even more specifically, the compositions may include a vinyl polymer of formula IV above in which n is 2 and the vinyl polymer backbone A is selected from formulas V and VI, as set forth above. In some embodiments, R$^3$ in formula V above is selected from butyl, particularly n-butyl, ethyl, hexyl, methoxyethyl and methoxymethyl. In some embodiments, R$^4$ in formula VI is ethyl.

For instance, in some embodiments, the vinyl polymer bearing terminal thiol functional group(s) may be selected from the following formulas VIf-VIj:

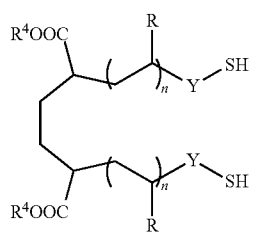
(VIf)

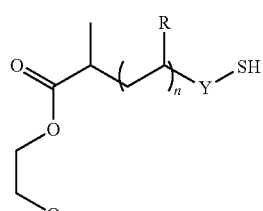
(VIg)

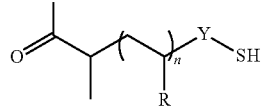
(VIh)

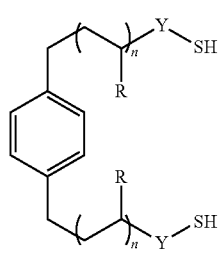

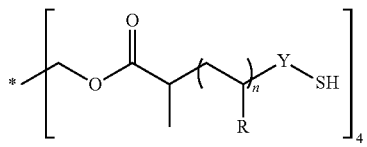
(VIi)

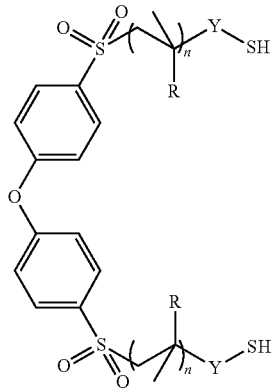
(VIj)

where R is independently selected from —OC(O)—CH$_2$—CH$_3$; —OC(O)—CH$_2$—CH$_2$—OCH$_3$; and —OC(O)—(CH$_2$)$_3$—CH$_3$; and the remaining variables are as defined above.

Thiol Cross-Linking Agents

The thiol cross-linking agent may be any thiol-containing component capable of cross-linking the vinyl polymer bearing alkenyl functional group(s) through a thiol-ene mechanism. In some embodiments, the thiol cross-linking agent is non-polymeric. In some other embodiments, the thiol cross-linking agent is a polymer. For instance, in some embodiments, a vinyl polymer bearing thiol functional group(s) of formula II above may be employed as the thiol cross-linking agent to form a thiol-ene curing composition.

In some embodiments, the thiol cross-linking agent is a tetrafunctional thiol. Examples of suitable thiol cross-linking agents include, but are not limited to, pentaerythritol tetrakis (3-mercaptopropionate), ethoxylated pentaerythritol tetrakis (3-mercaptopropionate), thiol-functionalized polydimethyl siloxanes, thiol-terminated polysulfides, dipentaerythritol hexakis thioglycolate, trimethylolpropane tris(2-mercaptoacetate), pentaerythritol tetrakis(2-mercaptoacetate), tripentaerythritol octakis thioglycollate, mercaptan-terminated propoxylated glycerol (Capcure 3-800), ethyleneglycol bis (3-mercaptopropionate), trimethylolpropane tris(thioglycolate) and combinations thereof.

Vinyl Cross-Linking Agents

The vinyl cross-linking agent may be any vinyl-containing component capable of cross-linking the vinyl polymer bearing thiol functional group(s) through a thiol-ene mechanism. In some embodiments, the vinyl cross-linking agent is non-polymeric. In some other embodiments, the vinyl cross-linking agent is a polymer. For instance, in some embodiments, a vinyl polymer bearing alkenyl functional group(s) of formula I above may be employed as the vinyl cross-linking agent to form a thiol-ene curing composition.

Examples of suitable vinyl cross-linking agents include, but are not limited to, 1,3,5-triallyl-1,3,5-triazine-2,4,6(1H,3H,5H)-trione (also referred to as triallylisocyanurate), triallyl cyanurate, diallyl bisphenol A, diallylether bisphenol A, triethyleneglycol divinyl ether, cyclohexanedimethanol divinyl ether, multi-functional norbornene monomers prepared by reaction of multifunctional acrylates with cyclopentadiene, norbornadiene, 1,2,4-benzenetricarboxylic acid tris[4-(ethenyloxy)butyl]ester, vinylcyclohexene, 1,2,4-trivinylcyclohexane and combinations thereof.

Suitable multi-functional norbornene monomers prepared by reaction of multifunctional acrylates with cyclopentadiene are described more fully in U.S. Pat. No. 4,808,638, which is incorporated herein by reference in its entirety.

Cure System

The compositions also include a cure system. The cure system includes at least one initiator for initiating thiol-ene curing of the compositions described herein. Initiators include photoinitiators, thermal initiators and combinations thereof.

Suitable photoinitiators for use herein include, but are not limited to, benzophenone and substituted benzophenones, acetophenone and substituted acetophenones, benzoin and its alkyl esters, xanthone and substituted xanthones, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone, bis acyl phosphine oxides, camphorquinone, metallocenes and mixtures thereof.

Exemplary photoinitiators include those available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Examples of suitable thermal initiators for use herein include, but are not limited to, peroxides, hydroperoxides and azonitriles, including benzoyl peroxide, tert-butyl perbenzoate, cumene hydroperoxide, tert-butyl hydroperoxide, 2,2'-azobis(isobutyronitrile), 1,1-azobis-cyclohexanecarbonitrile and mixtures thereof.

The amount of the initiators used in the compositions will typically be in the range of between about 0.1% to about 10% of the composition, and desirably from about 0.5% to about 5% by weight of the composition.

Optional Additives

The compositions also may include a variety of optional additives, such as, but not limited to, stabilizers, antioxidants, reinforcing agents, fillers, pigments, dyes, plasticizers and the like or mixtures thereof.

For fillers, generally any suitable mineral, carbonaceous, glass, or ceramic filler may be used, including, but not limited to: fumed silica; clay; metal salts of carbonates; sulfates; phosphates; carbon black; metal oxides; titanium dioxide; ferric oxide; aluminum oxide; zinc oxide; quartz; zirconium silicate; gypsum; silicium nitride; boron nitride; zeolite; glass; plastic powder; and combinations thereof. Fumed aluminum oxide and fumed silica are particularly desirable. The filler may be present in the composition in any suitable concentration in the curable composition. Generally, concentrations of from about 5% to about 80% by weight of the composition are sufficient. However, a more desirable range would be 20-60%.

Among the more desirable fillers are reinforcing silicas. The silica may be a fumed silica, which may be untreated (hydrophilic) or treated with an adjuvant so as to render it hydrophobic. The fumed silica should be present at a level of at least about 5% by weight of the composition in order to obtain any substantial reinforcing effect. Although optimal silica levels vary depending on the characteristics of the particular silica, it has generally been observed that the thixotropic effects of the silica produce compositions of impractically high viscosity before maximum reinforcing effect is reached. Hydrophobic silicas tend to display lower thixotropic ratios and therefore greater amounts can be included in a composition of desired consistency. In choosing the silica level therefore, desired reinforcement and practical viscosities must be balanced. A hexamethyldisilazane treated silica is particularly desirable (such as HDK2000, offered for sale commercially by Wacker-Chemie, Burghausen, Germany).

Methods of Preparing and Using the Compositions and Reaction Products Formed Therefrom The present invention also provides methods of preparing curable compositions, which include a component having thiol functionality, a component having alkenyl functionality and a cure system. In accordance with such methods, a vinyl polymer bearing at least one terminal functional group having the formula I or II, as defined above, is provided. A cross-linking agent is added to the vinyl polymer. When the vinyl polymer bears alkenyl terminal functional group(s) of formula I, a thiol cross-linking agent is added. When the vinyl polymer bears thiol terminal functional groups of formula II, a vinyl cross-linking agent is added. Any of the cross-linking agents described herein may be employed. A cure system, as described above, also is added to form the curable composition.

The compositions are useful in many applications, such as bonding together substrates, at least one of which is constructed of a metal or a synthetic material. Examples of such metals include steel and aluminum; and of the synthetic materials are of glass cloth phenolics and phenolic composites. The compositions may be used to form gaskets, particularly form-in-place gaskets ("FIPG") or cure-in-place gaskets ("CIPG").

In accordance with some embodiments, methods of using the curable compositions to seal together two or more substrates are provided. First, any of the curable compositions described above can be applied to at least one of two substrate surfaces. In some embodiments, the substrate surfaces are mated in an abutting relationship to form an assembly. Subsequently, the composition is exposed to an energy source. Suitable energy sources include, for example, radiation, heat or a combination thereof. Radiation includes UV light. The abutting relationship of the substrates is maintained for a time sufficient to allow the composition to cure.

Alternatively, in some embodiments, the composition may be applied to at least one of two substrate surfaces and then exposed to the energy source prior to mating the surfaces together to form the assembly. In gasketing applications, for example, the curable composition may be applied to one of the substrates which will form part of the gasket, cured or at least partially cured, and then joined to a second substrate to form a gasket assembly. Such gasketing applications include, for example, FIPG and CIPG. For example, in UV-cured CIPG, a bead of the composition may be applied to a substrate and first cured by exposure to UV light and then mated to a second substrate to form a compression seal.

The present invention additionally provides reaction products of the curable compositions described herein. More specifically, such product is formed upon exposure of any of the compositions described herein to curing conditions. Curing conditions include radiation, heat or a combination thereof. Radiation includes UV light, as well as other forms of light, such as visible, infrared and other forms of electromagnetic radiation.

EXAMPLES

Example 1

In this example, allylether hemiacetal ester terminated poly(n-butyl acrylate) was synthesized, according to the following reaction scheme.

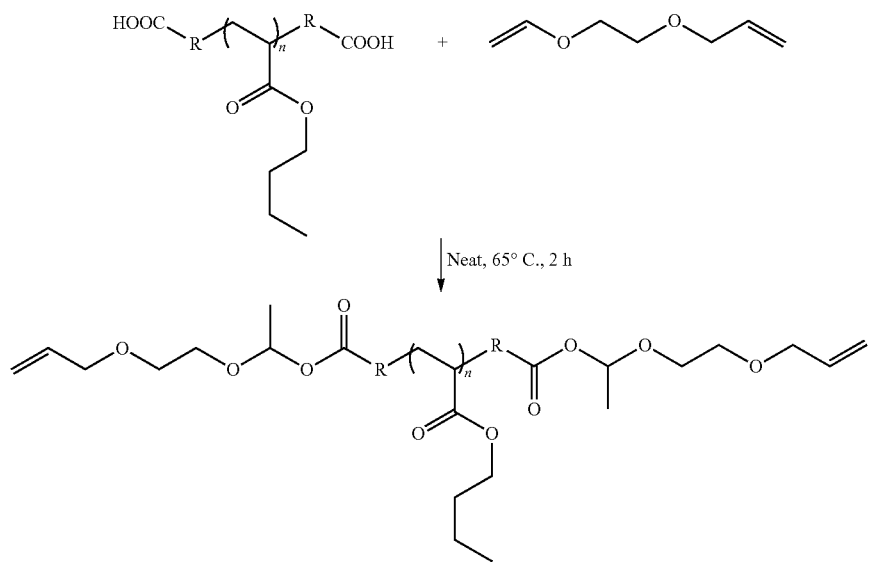

A solution of carboxylic acid terminated poly(n-butyl acrylate) (27.5 g; ~0.01 moles) with an acid value of 98 mg KOH/g and an average molecular weight of about 2,750 (CBB-3098 supplied by Esprix Technologies, Sarasota, Fla., USA) and 1-allyloxy-2-vinyloxyethane (6.272 g; 0.049 moles) (prepared as described by J. Crivello et al, *J. Polym. Sci. Part A,* 1996, 34, 1015) was stirred and heated to about 65° C. for 2 hours. The resulting resin was cooled to ambient temperature and evacuated on a rotary evaporator for 4 hours at 0.5 torr to remove excess unreacted vinyl ether monomer. The allylic functionalized resin was recovered in quantitative yield as a viscous liquid. JR spectroscopic analysis confirmed that all of the carboxylic acid was consumed and $^1$H NMR analysis indicated the presence of 1-allyoxyethoxyethyl hemiacetal ester or the starling carboxylic acid.

Example 2

In this example, hydroxyl terminated poly(n-butyl acrylate) was esterified with 10-undecenoyl chloride, according to the following reaction scheme.

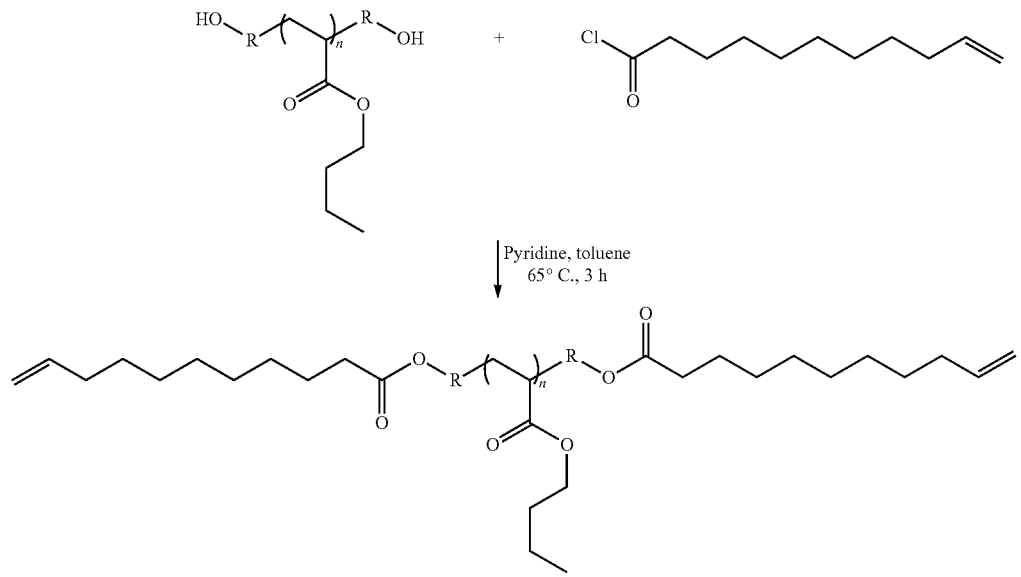

10-Undecenoyl chloride (8.526 g; 0.042 moles) was added slowly to a stirred solution of hydroxyl terminated poly(n-butyl acrylate) (26.5 g; ~0.01 moles) with an hydroxyl number of 185 mg KOH/g and an average molecular weight of about 2,450 (UMB-2005B, supplied by Esprix Technologies, Sarasota, Fla., USA) in toluene (50 mL) and pyridine (3.95 g) at 60° C. After the addition was complete, the reaction mixture was heated for an additional 3 hours and then cooled. The mixture was filtered, washed with dilute hydrochloride acid solution and then with sodium chloride solution and dried over anhydrous sodium sulfate. The desiccant was removed by filtration and the filtrate evacuated on a rotary evaporator at 0.5 torr and 50° C. to constant weight (~2 hours). IR spectroscopic analysis confirmed that all of the hydroxyl was consumed and $^1$H NMR analysis indicated the presence of undecenyl substituted ester.

Example 3

In this example, vinyl ether terminated poly(ethyl acrylate-co-2-methoxyethyl acrylate) was synthesized, according to the following reaction scheme,

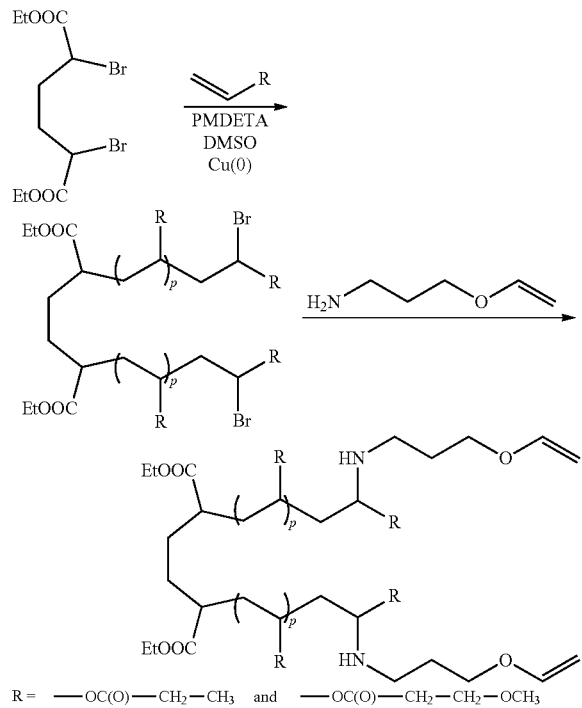

An equimolar blend of ethyl and 2-methoxyethyl acrylates (230 g) was polymerized by SET-LRP method described by V. Percec et al, *J. Am. Chem. Soc.* 2006, 128, 14156, using diethyl meso-2,5-dibromoadipate as initiator, pentamethyldiethylenetriamine as ligand, DMSO as solvent and 20-30 mesh copper shot as catalyst with monomers/initiator/ligand/solvent/catalyst in the mole ratios 100/1/0.5/50/10 respectively. After 6 hours at ambient temperature, the extent of polymerization had reached ~90% as determined by IR spectroscopy. The polymer was precipitated from the reaction mixture by addition of methanol/water, separated and diluted in THF. The THF solution was filtered through alumina and the filtrate evacuated on a rotary evaporator at 0.5 torr to yield ~200 g of a dibromo terminated, viscous liquid polymer having a number average molecular weight of 11,200 and a polydispersity of 1.2 (GPC, PMMA standards). A 20 g sample of the polymer (~0.004 eq) was dissolved in a solution of DMSO (20 mL) and triethylamine (2 mL) and 3-aminopropyl vinyl ether (4.0 g, 0.04 eq) was added while the mixture was stirred. After 40 hours stirring, the solution was precipitated in methanol/water, separated and dissolved in THF. The solvent and residual volatile components were removed by distillation on a rotary evaporator at 0.5 torr and 50° C., $^1$H NMR analysis and IR analyses of the isolated material were consistent with that of an aminopropylvinyl ether terminated copolymer of ethyl and 2-methoxyethyl acrylates.

Example 4

In this example, alkenyl terminated acrylate terpolymer was synthesized, according to the following reaction scheme.

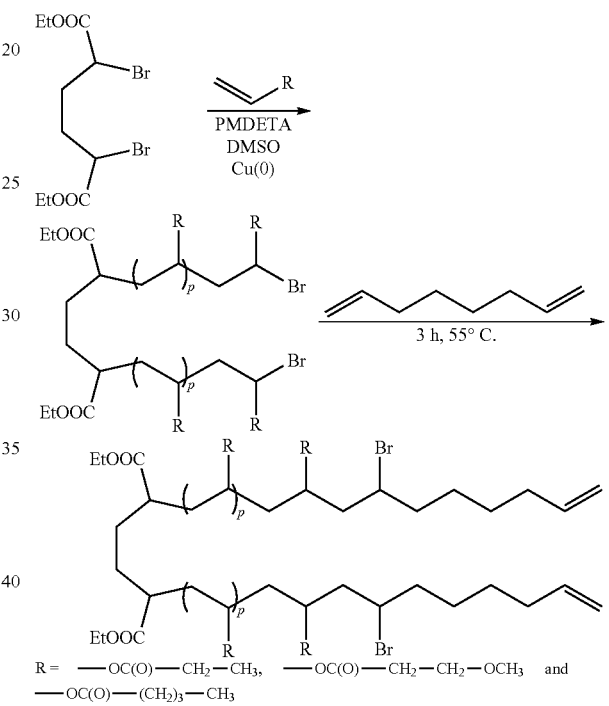

A blend of ethyl, 2-methoxyethyl and n-butyl acrylate in mole ratios 2/1/1 (229 g) was polymerized by the method described in Example 3 with monomers/initiator/ligand/solvent/catalyst in the mole ratios 180/1/0.5/90/10 respectively. When the conversion of monomers reached ~90% as measured by IR a ten-fold excess of 1,7-octadiene relative to initiator (6.11 g; 0.056 moles) was added and the mixture heated to 55° C. After 3 hours, the mixture was cooled to ambient temperature, the polymer precipitated by addition of methanol/water, separated and diluted in THF The THF solution was filtered through alumina and the filtrate evacuated on a rotary evaporator at 0.5 torr to yield ~190 g of a dialkenyl terminated, viscous liquid polymer having a number average molecular weight of 20,200 and a polydispersity of 1.3 (GPC, PMMA standards). The structure of the polymer was confirmed by $^1$H NMR spectroscopy.

Example 5

In this example, thiol functionalized polymer was synthesized by reaction of intermediate epoxide with thioacetic acid, as shown in the following reaction scheme.

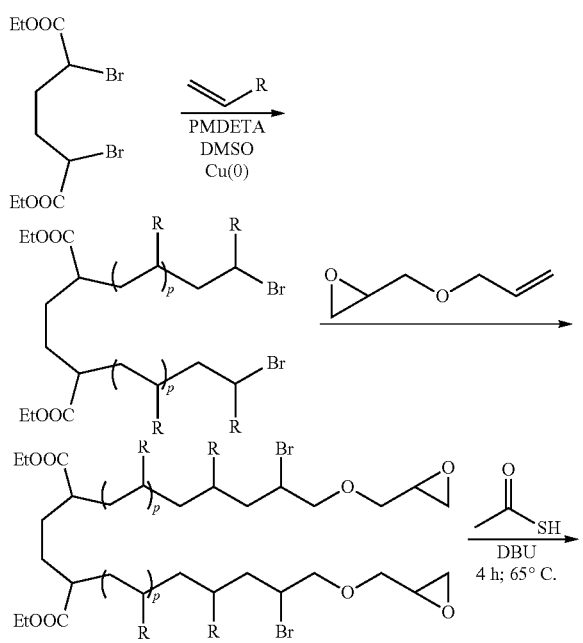

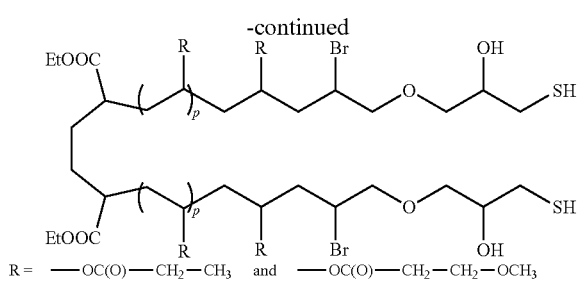

The polymerization reaction of Example 3 was repeated. When conversion of monomers reached ~95%, an excess of allyloxyglycidyl ether (4.56 g; 0.40 moles) was added and the reaction mixture stirred for 4 hours at ambient temperature. The polymer was precipitated from the reaction mixture by addition of methanol/water, separated and diluted in THF. The THF solution was filtered through alumina and the filtrate evacuated on a rotary evaporator at 0.5 torr to yield ~220 g of a diepoxide terminated, viscous liquid polymer having a number average molecular weight of 12,500 and a polydispersity of 1.3 (GPC, PMMA standards). The structure of the intermediate polymer was confirmed by $^1$H NMR spectroscopy. An aliquot of the polymer (20 g; ~0.004 eq) was treated with an excess of thioeacetic acid (1.5 g; 0.02 eq) in the presence of a catalytic amount of 1,8-diazabicyclo[5.4.0]undec-7-ene (DBU) and the mixture heated to 65° C. for 4 hours. The resulting polymer was precipitated in methanol/water, separated and diluted in THF. The THF solution was filtered through alumina and the solvent evaporated to yield a β-hydroxy thiol terminated polymer in about 85% yield.

Example 6

Photocurable thiol-ene compositions were prepared in accordance with the present invention.

Stoichiometric monomeric and polymeric thiol-ene premixes were prepared in accordance with the components and amounts indicated in Table 1. Tetra thiols, ethoxylated pentaerythritol tetrakis(3-mercaptopropionate) (PP150-TMP) and pentaerythritol tetrakis(3-mercaptopropionate) (PETMP) were supplied by Robinson Brothers, UK and Aldrich respectively. Triallylisocyanurate (1,3,5-triallyl-1,3,5-triazine-2,4,6-trione) was supplied by Aldrich.

TABLE 1

Stoichiometric thiol-ene premix compositions

| Component | Equivalent weight | Monomer premix A weight % | Polymer premix A weight % | Monomer premix B weight % | Polymer premix B weight % |
|---|---|---|---|---|---|
| Alkene polymer of Example 4 | 10,100 | | 97.4 | | 98.8 |
| PP150-TMP | 267 | 76.3 | 2.6 | | |
| PETMP | 122 | | | 59.5 | 1.2 |
| Triallylisocyanurate | 83 | 23.7 | | 40.5 | |

Two photocurable thiol-ene compositions, A and B, were then prepared by blending together, under yellow lighting, the respective monomer and polymer premixes with filler and photoinitiator, according to the amounts listed in Table 2.

TABLE 2

| Component | Composition A weight % | Composition B weight % |
|---|---|---|
| Polymer premix A | 80 | |
| Monomer premix A | 9 | |
| Polymer premix B | | 80 |
| Monomer premix B | | 9 |
| Fumed silica | 10 | 10 |
| Photoinitiator[1] | 1 | 1 |

[1]Combination of bis(2,6-dimethoxybenzoyl-2,4,4-trimethyl pentyl) phosphine oxide and 2-hydroxy-2-methyl-1-phenyl-propan-1-one (available commercially from Ciba Specialty Chemicals as Irgacure 1700)

Films of the photocurable compositions A and B, 2.0 mm in film thickness, were cast between release treated glass plates and exposed to UV light from a Zeta 7216 lamp with a Fusion H bulb at an incident intensity of 160 mW/cm2 for 30 seconds per side (60 seconds total). The cured films were removed and cut according to specification for the specific test method. Bulk material properties were measured on an Instron tensile tester according to ASTM D412 at a strain rate of 20 inch/min and results are the average of five specimens. Durometer hardness (Shore A) was measured according to ASTM D2240. Glass transition temperatures were measured by dynamic scanning calorimetry (DSC) at a heating rate of 20° C./min from −60 to 120° C. Compression set was determined according to ASTM D395-03. Compressibility was defined as the maximum extent to which a sample of known thickness could be compressed at a given temperature (typically 150° C.) without material failure. The results of these tests are presented in Table 3.

Surface cure was determined by the degree of residual tackiness in a film, 2 mm in film thickness after curing in air. Complex shear modulus and shrinkage were both determined using photorheometry. Samples were subjected to 1% strain at a fixed frequency of 1 Hz while being continuously irradiated under nitrogen by a high pressure mercury arc lamp at an incident intensity of 8.5 mW/cm². The experiment was performed using 25 mm diameter parallel plates at an initial gap of 1.0 mm; normal force measured on the plates was maintained at zero to allow for shrinkage measurement (i.e., gap reduction) as samples cured.

For comparative purposes a composition consisting of an poly(ethylene-co-methyl acrylate) dissolved in a blend of acrylate monomers also was prepared (Composition C). The comparative results also are presented in Table 3.

TABLE 3

Materials properties of photocured thiol-ene elastomers and comparative elastomer

| Property | Composition A | Composition B | Composition C |
|---|---|---|---|
| Surface cure | Tack-free | Tack-free | Tacky |
| Glass transition temperature (° C.) | −22 | −31 | −20 |
| Tensile strength (MPa) | 3 | 2 | 7 |
| Elongation (%) | 205 | 88 | 200 |
| Durometer hardness (Shore A) | 42 | 39 | 60 |
| Compression set: | | | |
| 22 h, 177° C., air | 45 | — | — |
| 70 h, 150° C., air | — | 31 | — |
| 500 h, 150° C., air | — | — | 24 |
| Compressibility (%) | 50 | — | 30 |
| Complex shear modulus (MPa) | — | 0.6 | 2.0 |
| Shrinkage (%) | — | 0.8 | 2.8 |

The results demonstrate that the photocured thiol-ene compositions of the present invention have mechanical properties suitable for compression sealing applications. In some respects the physical properties are significantly improved by comparison to current acrylate-based compositions (exemplified by Composition C) in particular improved surface cure, improved compressibility and reduced shrinkage.

Example 7

In this example, a thiol-ene composition of the present invention was cured and evaluated for oil resistance. Oil resistance is an indication that the composition may be useful as a sealant in automotive applications, such as automotive gasketing applications.

Composition A of Example 6 above was evaluated for oil resistance. Standard tensile specimens (in accordance with ASTM D412) were prepared and suspended from wire hangers in 0W-30 motor oil; the oil was then heated to 150° C. After one week, the samples were removed from the oil and cooled to room temperature, and excess oil was blotted off. Durometer hardness, tensile strength, and elongation were measured on the oil aged samples according to the relevant ASTM's. Results, compared with those of an unaged control made from the same batch, are shown in Table 4.

TABLE 4

Materials properties of Composition A before and after aging 1 week at 150° C. in motor oil

| Property | Before Aging | After Aging |
|---|---|---|
| Tensile strength (MPa) | 1.3 | 1.5 |
| Elongation (%) | 170 | 170 |
| Durometer hardness (Shore A) | 31 | 23 |

The results set forth in Table 4 above demonstrate that the photocured thiol-ene compositions of the present invention do not significantly degrade when exposed to hot oil and are therefore suitable materials for sealants in automotive applications.

Examples 8-9

In these examples, multifunctional thiol-terminated polyacrylates are prepared. In both Examples 8 and 9, the dibromo intermediate polymer of Example 3 is further reacted with a multifunctional thiol.

In particular, in Example 8, the dibromo intermediate polymer of Example 3 is reacted with excess trimethylolpropane tris(3-mercaptopropionic acid) in the presence of potassium carbonate to form thiol-terminated polyacrylates having the formula shown below. In Example 9, the dibromo intermediate polymer is reacted with pentaerythritol tetrakis(3-mercaptopropionic acid) in the presence of potassium carbonate to form thiol-terminated polyacrylates having the formula shown below.

Example 8

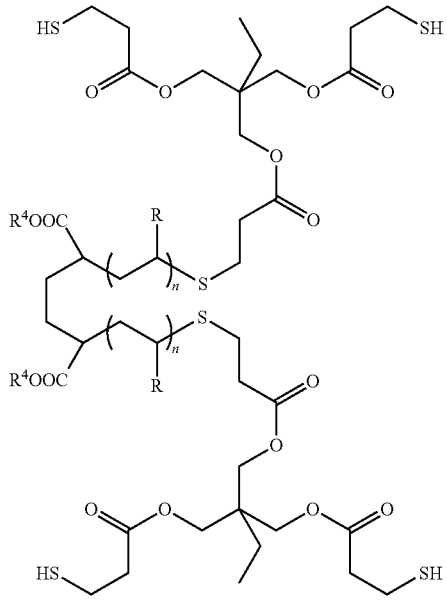

Example 9

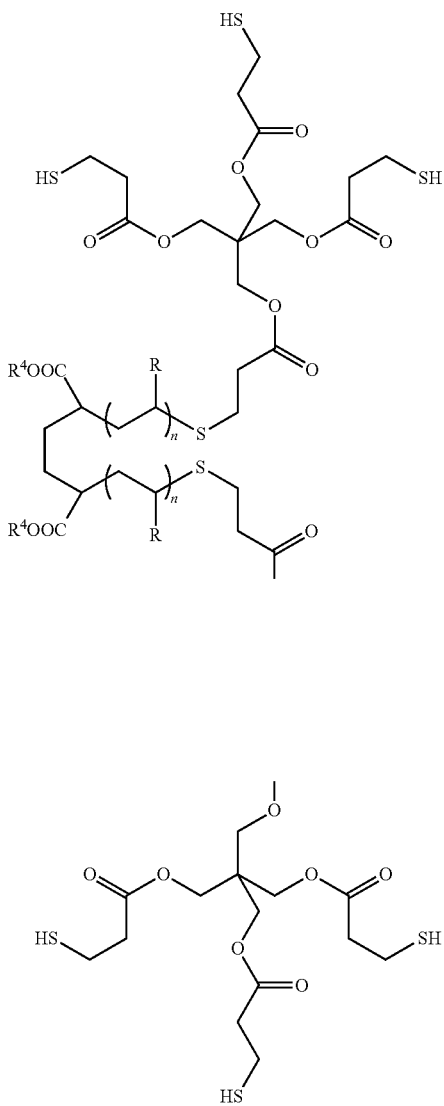

R = —OC(O)—CH₂—CH₃,  —OC(O)—CH₂—CH₂—OCH₃ and
—OC(O)—(CH₂)₃—CH₃

Example 10

In this example, a tetraalkenyl-terminated acrylate terpolymer is prepared using a tetra-functional initiator and a diene terminating agent.

A tetra-functional vinyl-terminated acrylate terpolymer is prepared according to the procedure of Example 4, in which the initiator, diethyl dibromoadipate, is replaced by pentaerythritol tetrakis(2-bromopropionate) and the capping agent, 1,7-octadiene, is replaced with 2,5-norbornadiene. After purification, the tetra-functional norbornene-terminated polymer is obtained. Preparation of the tetra-functional norbornene-terminated polymer is shown in the following reaction scheme.

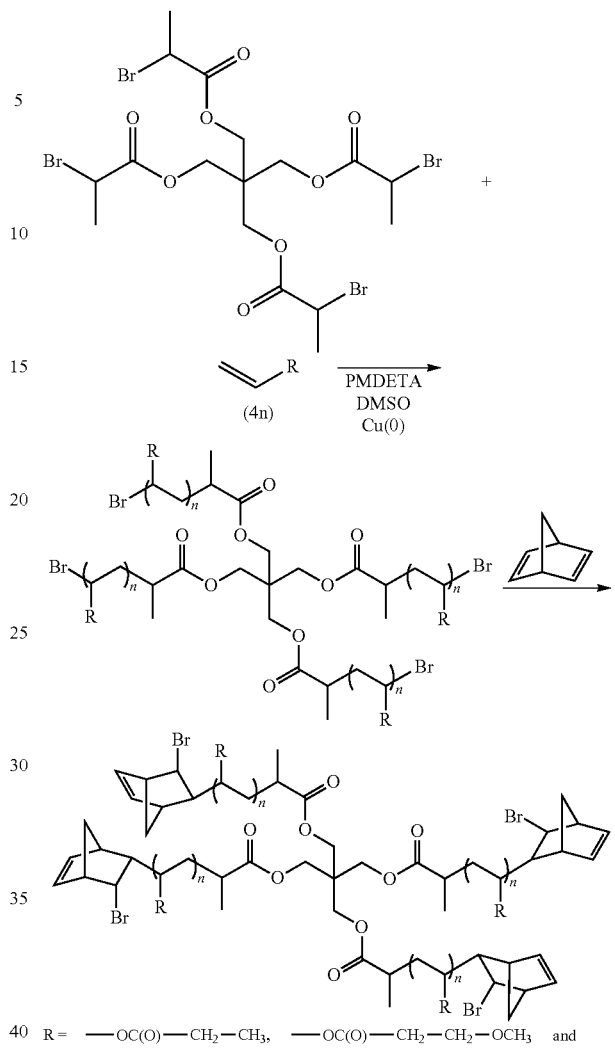

R = —OC(O)—CH₂—CH₃,  —OC(O)—CH₂—CH₂—OCH₃ and
—OC(O)—(CH₂)₃—CH₃.

Example 11

In this example, a tetraalkenyl-terminated acrylate terpolymer is prepared using a di-functional initiator and a triene terminating agent.

A tetrafunctional vinyl-terminated acrylate terpolymer is prepared according to the procedure of Example 4, in which the terminating agent, 1,7-octadiene, is replaced with 1,2,4-trivinylcyclohexane. The tetra-functional vinyl-terminated polymer is isolated after purification. Preparation of the tetra-functional vinyl-terminated polymer is shown in the following reaction scheme.

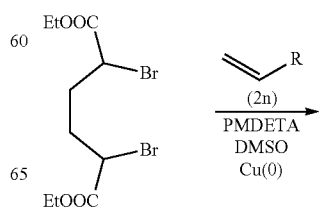

-continued

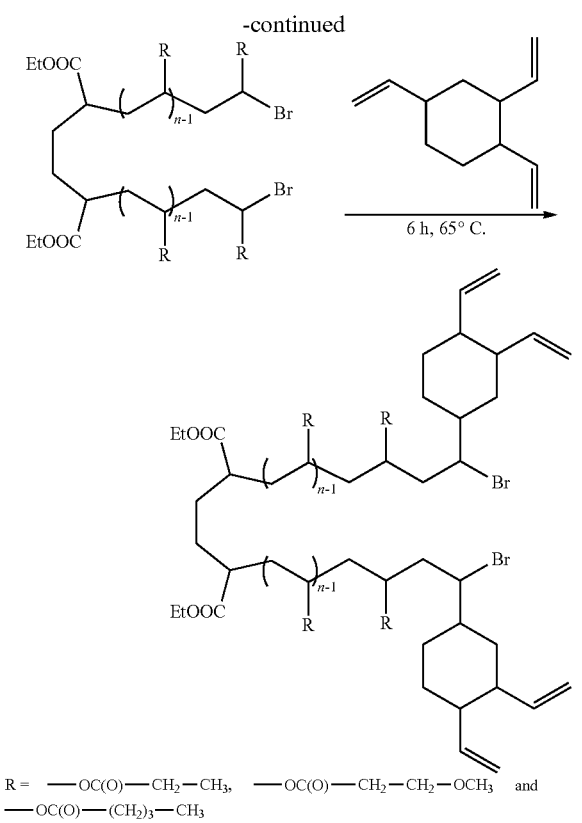

R = —OC(O)—CH$_2$—CH$_3$, —OC(O)—CH$_2$—CH$_2$—OCH$_3$ and
—OC(O)—(CH$_2$)$_3$—CH$_3$

What is claimed is:
1. A composition comprising:
(a) a vinyl polymer bearing at least one terminal functional group having the formula I or II:

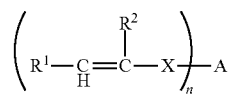

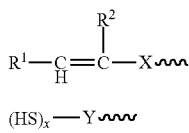

wherein:
R$^1$ and R$^2$ are independently selected from the group consisting of H, C$_{1-6}$ alkyl and C$_{4-8}$ cycloalkyl, or R$^1$ and R$^2$ when taken together with the carbon atoms to which they are attached complete a C$_{4-8}$ cycloalkenyl ring optionally containing a heteroatom;
X is selected from the group consisting of C$_{1-12}$ hydrocarbyl, oxygen and sulfur, wherein said C$_{1-12}$ hydrocarbyl optionally comprises one or more groups selected from ether, thioether, acetal, thioacetal, ester, thioester, urethane, urea, thiourea, amine, amide, thioamide, carbamate and carbonate;
Y is selected from the group consisting of C$_{1-17}$ hydrocarbyl optionally comprising one or more groups selected from ether, thioether, acetal, thioacetal, ester, thioester, urethane, urea, thiourea, amine, amide, thioamide, carbamate and carbonate;
x is 1 to 3;
(b) a cross-linking agent comprising one or more of:
(i) a thiol cross-linking agent when said vinyl polymer of (a) bears at least one functional group having the formula I; or
(ii) a vinyl cross-linking agent when said vinyl polymer of (a) bears at least one functional group having the formula II; and
(c) a cure system, wherein said vinyl polymer has the formula III:

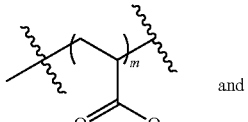

wherein n is 2 and A is a vinyl polymer backbone selected from the formulas V and VI:

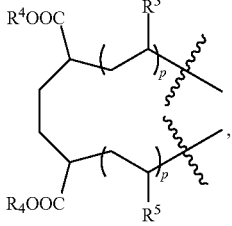

wherein:
R$^3$ is selected from C$_{1-6}$ alkyl, —CH$_2$OCH$_3$ and —CH$_2$CH$_2$OCH$_3$;
R$^4$ is ethyl;
R$^5$ is independently selected from —OC(O)—CH$_2$—CH$_3$; —OC(O)—CH$_2$—CH$_2$—OCH$_3$; and —OC(O)—(CH$_2$)$_3$—CH$_3$;
m is 10 to 10,000; and
p is 5 to 5,000.
2. The composition of claim 1, wherein R$^3$ is n-butyl.
3. A composition comprising:
(a) a vinyl polymer bearing at least one terminal functional group having the formula I or II:

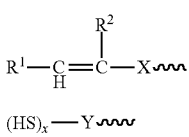

wherein:
R$^1$ and R$^2$ are independently selected from the group consisting of H, C$_{1-6}$ alkyl and C$_{4-8}$ cycloalkyl, or R$^1$ and R$^2$ when taken together with the carbon atoms to which they are attached complete a C$_{4-8}$ cycloalkenyl ring optionally containing a heteroatom;
X is selected from the group consisting of C$_{1-12}$ hydrocarbyl, oxygen and sulfur, wherein said C$_{1-12}$ hydrocarbyl optionally comprises one or more groups selected from ether, thioether, acetal, thioacetal, ester, thioester, urethane, urea, thiourea, amine, amide, thioamide, carbamate and carbonate;
Y is selected from the group consisting of C$_{1-17}$ hydrocarbyl optionally comprising one or more groups selected from ether, thioether, acetal, thioacetal, ester, thioester, urethane, urea, thiourea, amine, amide, thioamide, carbamate and carbonate;

x is 1 to 3;

(b) a cross-linking agent comprising one or more of:
(i) a thiol cross-linking agent when said vinyl polymer of (a) bears at least one functional group having the formula I; or
(ii) a vinyl cross-linking agent when said vinyl polymer of (a) bears at least one functional group having the formula II; and
(c) a cure system, wherein said vinyl polymer has the formula IV:

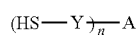    IV wherein n is 2 and A is a vinyl polymer backbone selected from the formulas V and VI:

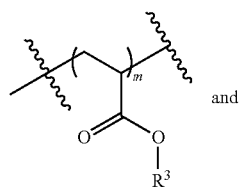 and    V

-continued

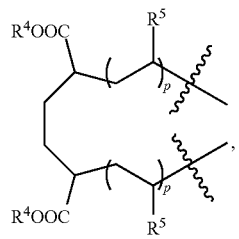    VI wherein:

$R^3$ is selected from $C_{1-6}$ alkyl, —$CH_2OCH_3$ and —$CH_2CH_2OCH_3$;

$R^4$ is selected from $C_{1-6}$ alkyl;

$R^5$ is independently selected from —OC(O)—$CH_2$—$CH_3$; —OC(O)—$CH_2$—$CH_2$—$OCH_3$ and —OC(O)—$(CH_2)_3$—$CH_3$;

m is 10 to 10,000; and p is 5 to 5,000.

4. The composition of claim 3, wherein $R^3$ is n-butyl.

5. The composition of claim 3, wherein $R^4$ is ethyl.

* * * * *

UNITED STATES PATENT AND TRADEMARK OFFICE
CERTIFICATE OF CORRECTION

PATENT NO. : 9,243,083 B2  
APPLICATION NO. : 12/062090  
DATED : January 26, 2016  
INVENTOR(S) : John G. Woods, Richard O. Angus, Jr. and Joel D. Schall Page 1 of 1

It is certified that error appears in the above-identified patent and that said Letters Patent is hereby corrected as shown below:

In the Specification

Column 4, line 31: Change "and $R^1$" to -- and $R^2$ --.
Column 5, lines 29 and 30: Change "cross-liking" to -- cross-linking --.
Column 5, line 54: Change "alkenyl thiol" to -- alkenyl:thiol --.
Column 6, line 38: Change "-(methacryloyloxypropyl)" to -- 2-(methacryloyloxypropyl) --.
Column 6, line 60: Change "methaerylonitrile" to -- methacrylonitrile --.
Column 10, line 45: Change "pentacrythritol" to -- pentaerythritol --.
Column 14, line 32: Change "JR" to -- IR --.
Column 14, line 36: Change "starling" to -- starting --.
Column 16, line 55: After "in THF", insert -- . --.
Column 18, line 2: Change "thioeacetic" to -- thioacetic --.
Column 18, line 61: Change "W/cm2" to -- W/cm$^2$ --.

Signed and Sealed this  
Twelfth Day of July, 2016

Michelle K. Lee  
*Director of the United States Patent and Trademark Office*